(12) United States Patent
Hahn

(10) Patent No.: US 6,682,132 B1
(45) Date of Patent: Jan. 27, 2004

(54) ROOF MODULE FOR A VEHICLE

(75) Inventor: Roland Hahn, Germering (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/831,747

(22) PCT Filed: Nov. 9, 1999

(86) PCT No.: PCT/EP99/08562

§ 371 (c)(1),
(2), (4) Date: Aug. 28, 2001

(87) PCT Pub. No.: WO00/29234

PCT Pub. Date: May 25, 2000

(30) Foreign Application Priority Data

Nov. 13, 1998 (DE) .......................................... 198 52 383

(51) Int. Cl.⁷ ................................................. B60J 7/00
(52) U.S. Cl. ....................................... 296/215; 296/210
(58) Field of Search ................................ 290/215, 211, 290/210, 191; 264/271.1, 279; 52/204.6; 136/244

(56) References Cited

U.S. PATENT DOCUMENTS

| | | | | |
|---|---|---|---|---|
| 5,228,925 A | * | 7/1993 | Nath et al. ............... | 296/215 X |
| 5,409,290 A | | 4/1995 | Grimm et al. | |
| 5,524,955 A | * | 6/1996 | Brocke et al. ............... | 296/216 |
| 5,545,261 A | * | 8/1996 | Ganz et al. ............. | 296/215 X |
| 6,220,656 B1 | * | 4/2001 | Martin, Jr. ................... | 296/215 |
| 2002/0053816 A1 | * | 5/2002 | Teschner et al. ........... | 296/211 |

FOREIGN PATENT DOCUMENTS

| | | |
|---|---|---|
| DE | 35 39 449 | 5/1987 |
| DE | 41 05 396 | 9/1992 |
| DE | 43 08 215 | 3/1994 |
| DE | 196 37 793 | 11/1997 |
| DE | 198 08 113 | 9/1998 |
| JP | 60-22565 | * 2/1985 |

* cited by examiner

Primary Examiner—Joseph D. Pape
(74) Attorney, Agent, or Firm—Nixon Peabody LLP; David S. Safran

(57) ABSTRACT

A roof module for a motor vehicle and a process of producing a roof module which includes at least two flat roof covers located adjacent to one another and which are joined to one another using a tool which disperses a peripheral foam material.

18 Claims, 3 Drawing Sheets

ROOF MODULE FOR A VEHICLE

BACKGROUND OF THE INVENTION

1. Field of the Invention

The invention is directed generally to a roof module for a motor vehicle and a process of producing a roof module for a motor vehicle.

2. Description of the Prior Art

It is conventional for roof covers for motor vehicle roofs, for example, transparent glass panes or solar cell covers, to be individually foamed around the periphery of the roof with a suitable plastic such as polyurethane (PUR). As disclosed in German Patent Publication DE 41 05 396 A1, this is done in order to attach mounting covers for mounting on or support in a roof frame. Often it is desirable to integrate several such covers in a motor vehicle roof, however, the production, handling and mounting of the individual covers overall are rather complex. In addition, the individual covers must be sealed against one another and must also be aligned vertically (Z direction) to one another.

U.S. Pat. No. 5,409,290 discloses a glass plate for a motor vehicle roof which is connected to a reinforcing plate located at least in component areas thereunder, with peripheral plastic foaming.

SUMMARY OF THE INVENTION

In view of the foregoing, it is an object of the present invention to provide a roof module for a motor vehicle roof and a process of producing such a roof module having flat covers to provide an overall simple production, handling and installation.

These and other objects are achieved with a roof module having at least two flat roof covers which are located adjacent to one another and which are joined thereto around the outer periphery with foam from a foaming tool. In accordance with the present invention, it is advantageous that several functional flat roof covers are used to enhance the production of the roof module. This is so since only one foaming process using only one foaming tool is necessary, and thereby, handling and mounting are simplified, since it requires that only one roof module be handled in order to mount the entire module on the motor vehicle. Furthermore, the foaming technique makes it possible for flat covers of different thickness and/or made of different materials to be peripherally foamed together, to thereby create a "flush design" between individual covers whereby all tolerances can be equalized in all three spatial directions in the foaming tool.

Preferably, the peripheral foaming is made of polyurethane. In an exemplary embodiment of the present invention, one of the flat roof covers is transparent while the other is opaque and preferably includes a plurality of solar cells. The roof module is preferably made as a fixed glass cover, but may also be a selectively movable glass cover. In another exemplary embodiment, the flat roof module in an edge area is continuously foamed around the edge in order to hold a seal to thereby prevent leakage in these areas. In another embodiment of the invention, the flat roof covers in the area in which they border one another are adjoined by a peripheral foaming area into which a reinforcement such as a sheet metal insert is foamed at the same time.

DETAILED DESCRIPTION OF THE PREFERRED EMBODIMENTS

Figure 1:
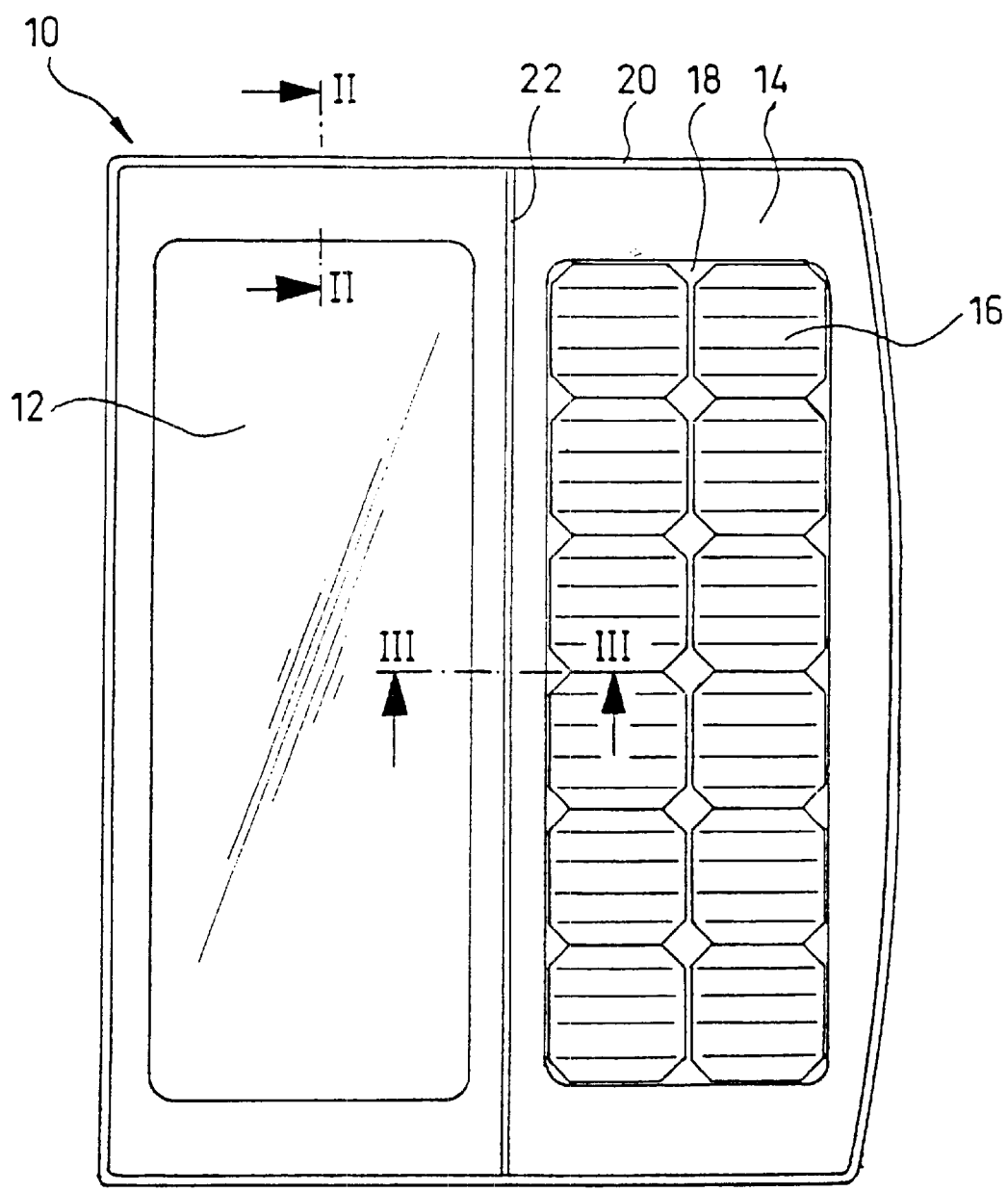
FIG. 1 shows an overhead view of a roof module in accordance with the present invention.
Figure 2:
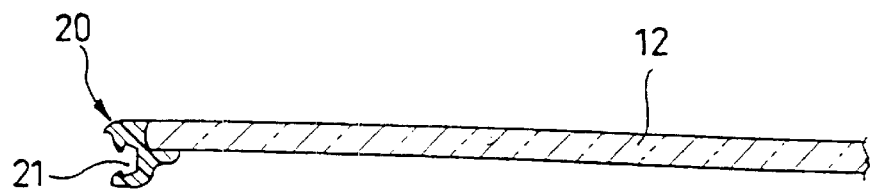
FIG. 2 shows a section along the line II—II in FIG. 1.
Figure 3:
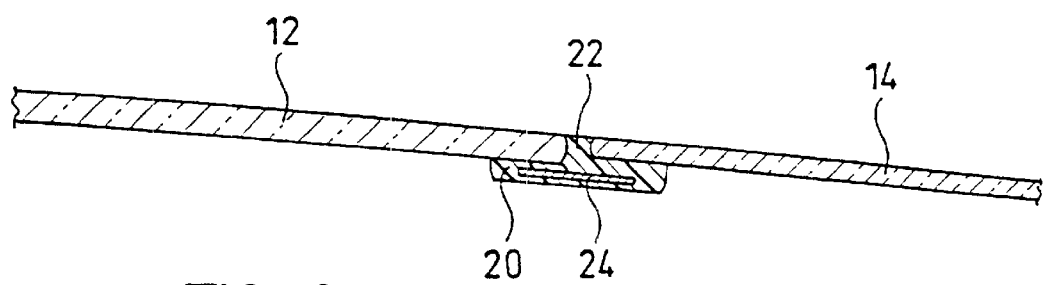
FIG. 3 shows a section along the line III—III in FIG. 1.

FIGS. 1 through 3 show a roof module for a motor vehicle and which includes a fixed glass cover 10 having a transparent glass pane 12 and a cover 14 adjoining the transparent glass pane 12 along a horizontal direction. As shown in FIG. 1, the cover 14 is provided with a plurality of solar cells 16 for producing solar current for recharging a motor vehicle battery and/or for operating other motor vehicle systems, for example, a fan. The solar cover 14 is built in the conventional manner and includes a substrate 18 in the form of a glass or plastic pane onto which the plurality of solar cells 16 are laminated. Alternatively, the substrate 18 is composed of sheet metal onto which the solar cells 16 are cemented. Furthermore, the solar cells 16 are provided with a suitable protective cover such as a plexiglass pane.

The glass pane 12 and the solar cover 14 in the horizontal direction have a certain distance and are provided on their peripheral edge continuously with peripheral polyurethane foam (PUR) 20. Of course, instead of polyurethane, other suitable plastics can also be used. As shown in FIG. 2, in the side areas, the peripheral PUR foam 20 is made such that it can hold a seal (not shown) in a groove 21 and thereby, prevent leaking at the cover 10. In this way, complete sealing of the fixed glass cover 10 can be achieved at least in the side area. However, peripheral foaming is also possible in which there are no grooves 21 because there are seals on the solid roof or due to the fact that the peripheral foam in the edge area is so soft and elastic that it assumes the sealing function. The glass pane 12 and the solar cover 14 are adjoined in an intermediate area 22 therebetween using the peripheral PUR foam 20. As shown in FIG. 3, for reinforcement in the intermediate area 22 underneath the glass pane 12 and the solar cover 14, a reinforcing cover in the form of a sheet metal insert 24 is foamed in at the same time. To add aesthetic value to the overall design, in order to cover the peripheral foam area from overhead the glass pane 12 can be provided in the conventional manner with printing (filter).

The described roof module 10 is produced by the two flat covers, i.e., the glass pane 12 and the solar cover 14, being positioned in a foaming tool so that the tolerances in all three spatial directions can be easily equalized by the relative positioning in the foaming tool. The glass pane 12 and the solar cover 14 are peripherally foamed in one step in the foaming tool with PUR and in the intermediate area 22 between the glass pane 12 and the solar cover 14. The sheet metal insert 24 is foamed in at the same time. Because the glass pane 12 and the solar cover 14 in the intermediate area 22 are adjoined by peripheral foaming 20, a gap is avoided which would be formed if the glass pane 12 and the solar cover 14 were installed as separate covers in the motor vehicle roof. As a result, sealing problems are avoided and an optically pleasing appearance ("flush design") is achieved.

Figure 4:
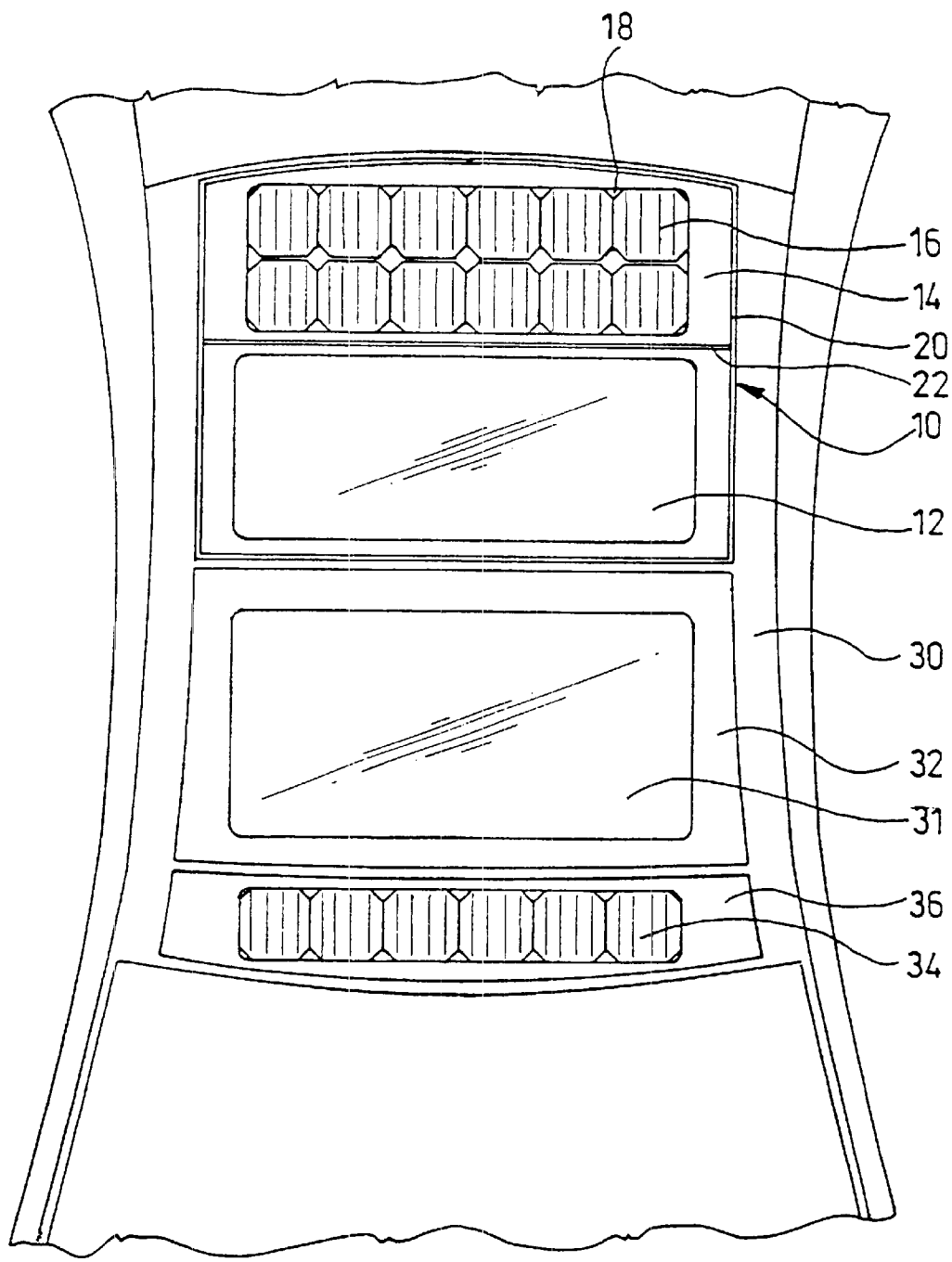
FIG. 4 shows an overhead view of a motor vehicle roof in which the roof module shown in FIG. 1 is installed.

FIG. 4 shows a motor vehicle roof in which the fixed glass cover 10 shown in FIGS. 1 through 3 is installed. The motor vehicle roof includes a solid roof skin 30 and a roof opening 31 which is made in the solid roof skin 30 and in which a frame (not shown) is attached. The frame bears the fixed glass cover 10 which closes the rear part of the roof opening 31 and seals the opening 31. A glass pane 12 forms a transparent area from the motor vehicle interior to the inside, an adjustable glass cover 32 which is supported with a pivoting and/or displacement capacity on the frame in order to at least partially clear the front part of the roof opening 31, and a wind deflector louver 36 which is provided with a plurality of solar cells 34 and which can be pivoted outwardly in order to reduce airstream noise when the cover 32 is selectively placed in an open position.

Accordingly, the one-piece execution of the fixed glass cover 10 offers advantages that, although in this way two different flat roof covers 12, 14 with different functions can be implemented, sealing problems are avoided, production remains simple, tolerances in production can be easily equalized, covers with a different thickness or made of different materials can be used, and handling, especially installation, remains simple because only one roof module need be handled.

Instead of a glass pane and a solar cover, other covers can be used such as at least one of a glass pane provided with a plurality of solar cells, a surface-treated sheet metal, an enameled motor vehicle sheet metal, a plastic pane and the like. And instead of two flat roof covers, multiple covers such as three or more flat covers can be joined to one another in the same way by way of peripheral foaming so that they form a single roof module.

Reference Number List fixed glass element 10
transparent glass pane 12
solar element 14
solar cells 16
substrate 18
peripheral PUR foam 20
(seal-holding) groove 21
area between 12 and 14 22
reinforcing element 24
roof skin 30
roof opening 31
glass cover 32
solar cells of 36 34
wind deflector louver 36

What is claimed is:

1. A roof module for a motor vehicle, said roof module comprising:
    at least two flat roof cover panels for covering respective areas of a motor vehicle roof opening, said at least two flat roof cover panels being arranged side by side in a nonoverlapping relationship with one edge of one of the at least two cover panels being located adjacently facing the respective edge of another of the at least two cover panels,
    wherein said at least two flat roof cover panels have been joined to each other by a surrounding peripheral foaming to thereby form an integral flat roof cover.

2. The roof module as claimed in claim 1, wherein said peripheral foaming is a plastic.

3. The roof module as claimed in claim 2, wherein said plastic is polyurethane.

4. The roof module as claimed in claim 3, wherein said at least two flat roof cover panels comprises at least one of a transparent glass pane, a glass pane provided with a plurality of solar cells, a surface-treated sheet metal, an enameled vehicle sheet metal and a plastic pane.

5. The roof module as claimed in claim 4, wherein one of said at least two flat roof cover panel is a transparent flat roof cover and the other is an opaque flat roof cover.

6. The roof module as claimed in claim 5, wherein said opaque flat roof cover has a plurality of solar cells.

7. The roof module as claimed in claim 6, wherein said at least two flat roof cover panel are continuously foamed peripherally at an edge area.

8. The roof module as claimed in claim 7, further comprising a reinforcement element provided at an intermediate area between said at least two flat roof cover panels.

9. The roof module as claimed in claim 8, wherein reinforcement element is a sheet metal insert.

10. A process for producing a roof module for a motor vehicle, said process comprising the steps of:
    arranging at least two flat roof cover panels for covering respective areas of a motor vehicle roof opening such that they are arranged side by side in a nonoverlapping relationship with one edge of one of the at least two cover panels being located adjacently facing the respective edge of another of the at least two cover panels; and
    joining said at least two flat roof cover panels with a surrounding peripheral foaming to thereby form an integral flat roof cover.

11. The process as claimed in claim 10, wherein said peripheral foaming is a plastic.

12. The process as claimed in claim 11, wherein said plastic is polyurethane.

13. The process as claimed in claim 12, wherein said at least two flat roof cover panels comprise at least one of a transparent glass pane, a glass pane provided with a plurality of solar cells, a surface-treated sheet metal, an enameled vehicle sheet metal and a plastic pane.

14. The process as claimed in claim 13, wherein one of said at least two flat roof cover panels is a transparent flat roof cover and the other is an opaque flat roof cover.

15. The process as claimed in claim 14, wherein said opaque flat roof cover has a plurality of solar cells.

16. The process as claimed in claim 15, wherein said at least two flat roof cover panels are continuously foamed peripherally at an edge area.

17. The process as claimed in claim 16, further comprising a step of foaming a reinforcement element at an intermediate area between said at least two flat roof cover panels simultaneously with the step of adjoining said at least two flat roof covers.

18. The process as claimed in claim 17, wherein said reinforcement element is a sheet metal insert.

* * * * *